Figure 1:
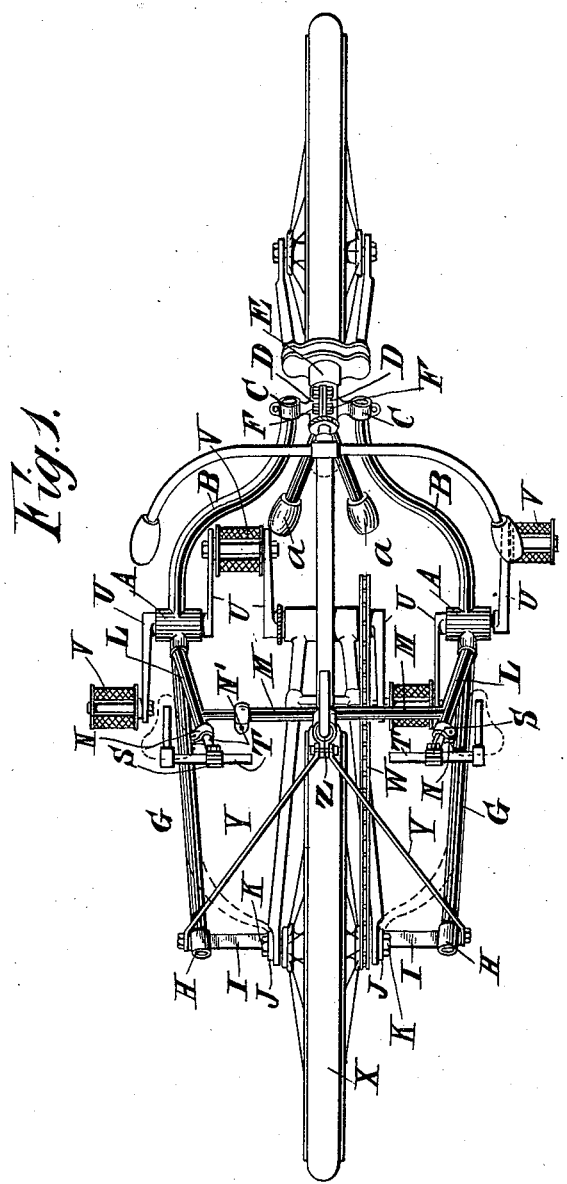

(No Model.) 2 Sheets—Sheet 1.

R. GRILLI.
BICYCLE ATTACHMENT.

No. 563,957. Patented July 14, 1896.

Witnesses:
James J. Van Hovenberg
Duncan M. Robertson.

Inventor:
Romeo Grilli
by Gartner &bo
Atty (No Model.) 2 Sheets—Sheet 2.
R. GRILLI.
BICYCLE ATTACHMENT.

No. 563,957. Patented July 14, 1896.

Witnesses:
James J. Van Hovenberg
Duncan Th. Robertson.

Inventor:
Romeo Grilli
by
Partner & Co.
Attys.

UNITED STATES PATENT OFFICE.

ROMEO GRILLI, OF CHARKOFF, RUSSIA.

BICYCLE ATTACHMENT.

SPECIFICATION forming part of Letters Patent No. 563,957, dated July 14, 1896.

Application filed March 26, 1896. Serial No. 585,033. (No model.) Patented in England February 28, 1896, No. 4,525.

*To all whom it may concern:*

Be it known that I, ROMEO GRILLI, a subject of the King of Italy, residing at 15 Sumscaia, Charkoff, Russia, have invented certain new and useful Improvements in or relating to Bicycles, (patented in Great Britain, No. 4,525, dated February 28, 1896,) of which the following is a specification.

The object of this invention is to provide an adjustable attachment for bicycles, whereby a single-seat bicycle can be readily and quickly changed or transformed into one with two seats side by side.

The invention consists in the improved bicycle attachment, and in the combination and arrangement of the various parts thereof, substantially as will be hereinafter more fully described and finally embodied in the claim.

In carrying my invention into practice, as applied to a safety bicycle, I provide side bars which are half clipped to the neck of the front fork by suitable nuts and bolts and by a reverse curve backwardly and downwardly support a bracket which carries the extra cranks coaxially with the bottom bracket of the main frame of the machine. The said additional side bars are prolonged backwardly from the extra pedal bracket and slightly upwardly and inwardly to the axle of the chain-wheel, to which it is secured by a nut.

Additional saddle-posts upstand from the side bars parallel with the main saddle-post, to which a telescopic, horizontal tie-bar is half clipped in the same manner as to the front fork neck.

The saddle T's are so arranged as to be capable of two adjustments vertically to suit the length of leg of the rider and laterally from or to the main saddle-post to accurately balance the weight of the respective riders with respect to the center line of the machine.

The outside crank on each side bar carries a pedal, but the inside crank, which may be of lighter construction, is connected to the pedal of the machine to be converted, and may be so slotted that should the extra pedal brackets not be coaxial with the main pedal bracket the consequent eccentric motion will be taken up in the said slot and prevent any binding or jamming of the working parts.

The side bars are of sufficient distance from the main frame of the bicycle to allow of the free movement of the rider's legs and rotation of the double cranked inside pedal.

Tie-rods from the top of the main saddle-post to the back end of the side bars may be provided to impart extra rigidity to the machine if required, and I may also provide adjustable and removable hand-grips to the front fork neck for convenience of pose when riding in double-breasted order.

Inasmuch as the front of the side-saddles are unhampered by the rods the machine is so open that persons of either or both sexes can ride the machine, and by the great range of adjustability as regards height and weight children can also be accommodated without upsetting its balance.

When the machine is made as a whole, the half clips are of course dispensed with, the side bars are brazed or otherwise secured in their respective positions.

My invention is clearly represented by the annexed drawings.

Figure 2:
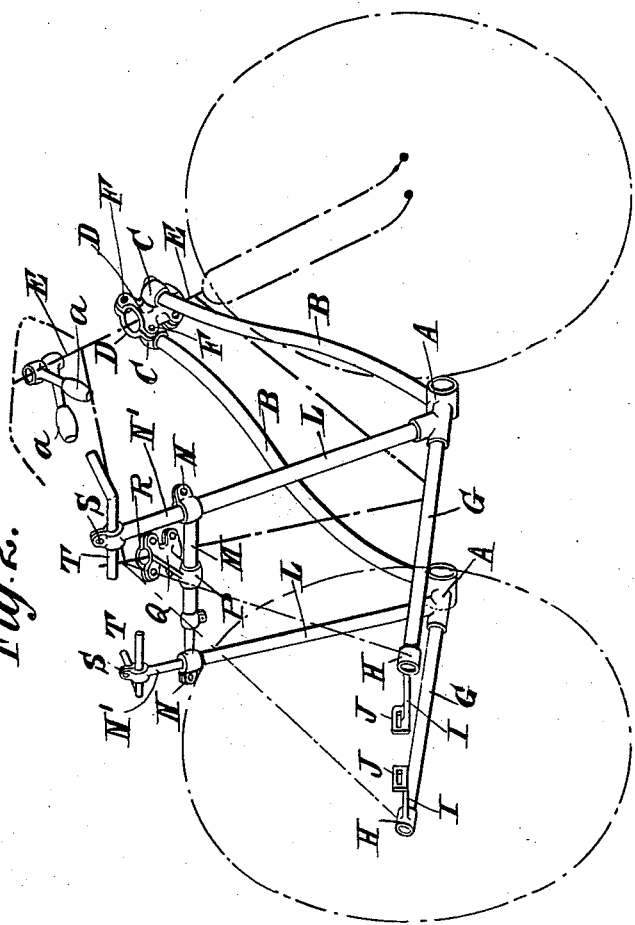

Figure 1 is a plan of a safety bicycle to which my invention is applied; Fig. 2, a perspective elevation from the rear side showing the new or added parts to a safety bicycle, which I show by dotted lines.

A A are two multiple sockets as bottom brackets, to the front of which the forwardly and inwardly curved bars B B are affixed, said bars terminating in other sockets C C, forming part of half-clip plates D D, embracing the front-frame tube E and secured rigidly by bolts and nuts F F passed through the flanges thereof.

G G are rearwardly-arranged bars from the sockets A A and terminating in collars H H, having bars I I at or about right angles for attachment by the lugs J J to the rear axle K outside the ordinary back fork, which is part of the bicycle proper.

L L are upright rods affixed to the sockets A A. These rods are rearwardly inclined and are united by a cross-bar M and clips N N to enable the rods N' N' to be fixed at the desired height. This cross-bar has a central collar P with a web Q projecting forwardly and terminating in a half-round clip which, together with a face-plate R, for attachment to the center stay of the bicycle.

The two uprights N' N' at the upper ends have clip-flanges S S, within which the longer legs of the L-pins T T can be set horizontally for carrying the saddles, on which the riders sit, the saddles occupying a position indicated by dotted lines at Fig. 1.

The sockets A A, for the purpose of supporting the additional crank-axles, constitute brackets in the line or coaxially with the ordinary crank-bracket of the machine, and to the cranks U U, pedals V V, are mounted in the usual manner for transmitting motion by the chain-gear W to the rear drive-wheel X.

I fasten two struts Y Y to the extremities H H of the bars G G, these being connected to a clip Z, secured to the center stay, and to enable the two riders to have handles for steadying themselves on the machine I attach to the stem of the front fork a couple of short rod-handles $a\ a$, the inner hands of the two riders being crossed to give the necessary balance to their arms when mounted.

What I claim, and desire to secure by Letters Patent, is—

The combination with the sockets A, of the inwardly-curved bars B, projecting upward and forward from said sockets, a half-clip plate arranged at the free end of each of said bars, the bars G projecting rearward from the sockets A and provided at their free ends with lugs J, the upright rods L also arranged in said sockets A and provided at their upper portions with the clips N, rods N' vertically adjustable in said clips N and their respective rods L, L pins T horizontally adjustable on the said rods N', the cross-bar M connecting the clips N, a sleeve P on said cross-bar, and provided with a forwardly-projecting web Q, the face-plate R adapted to engage the forward portion of said web, a crank U in each of the sockets A, and pedals supported by the outer portions of said cranks, all said parts adapted to be attached to an ordinary safety rear-driving bicycle, substantially as and for the purposes described.

In testimony whereof I have hereunto set my hand in presence of two subscribing witnesses.

ROMEO GRILLI.

Witnesses:
PERCY E. MATTOCKS,
EDMUND S. SNEWIN.